United States Patent [19]
Diehl et al.

[11] Patent Number: 5,375,571
[45] Date of Patent: Dec. 27, 1994

[54] COAXIALLY MOUNTED ENGINE BALANCE SHAFTS

[75] Inventors: Roy E. Diehl, Northville; Alvin H. Berger, Brownstone, both of Mich.

[73] Assignee: Ford Motor Company, Dearborn, Mich.

[21] Appl. No.: 225,109

[22] Filed: Apr. 8, 1994

[51] Int. Cl.5 ............................................. F16F 15/26
[52] U.S. Cl. .................................. 123/192.2; 74/603
[58] Field of Search ................ 123/192.2; 74/603, 604

[56] References Cited

U.S. PATENT DOCUMENTS

| | | | |
|---|---|---|---|
| 3,511,110 | 5/1970 | Grieve | 123/192.2 |
| 4,480,607 | 11/1984 | Tsai et al. | 123/192.2 |
| 4,617,885 | 10/1986 | Oshiro et al. | 123/192.2 |
| 4,644,916 | 2/1987 | Kitagawa | 123/192.2 |
| 4,683,849 | 8/1987 | Brown | 123/192.2 |
| 4,688,526 | 8/1987 | Nivi et al. | 123/192.2 |
| 4,703,725 | 11/1987 | Weertman | 123/192.2 |
| 4,712,436 | 12/1987 | Brown | 123/192.2 |
| 4,819,505 | 4/1989 | Takubo et al. | 123/192.2 |
| 4,936,268 | 6/1990 | Randle | 123/192.2 |
| 5,038,727 | 8/1991 | Burns et al. | 123/192.2 |
| 5,131,355 | 7/1992 | Bukovics et al. | 123/192.2 |

Primary Examiner—Noah P. Kamen
Attorney, Agent, or Firm—Jerome R. Drouillard; Roger L. May

[57] ABSTRACT

A V-type engine is provided with a camshaft driven balance shaft assembly that is compactly located in the valley between the banks of cylinders and consists of a pair of coaxially mounted first and second order balance shafts, one within the other, each of which has diametrically opposed counterweights on opposite sides of the center of the shaft that effect rotating moments to cancel residual first order and second order inertial unbalance moments that occur during normal engine operation that have not previously been cancelled by conventional counterweights mounted on the engine crankshaft.

10 Claims, 3 Drawing Sheets

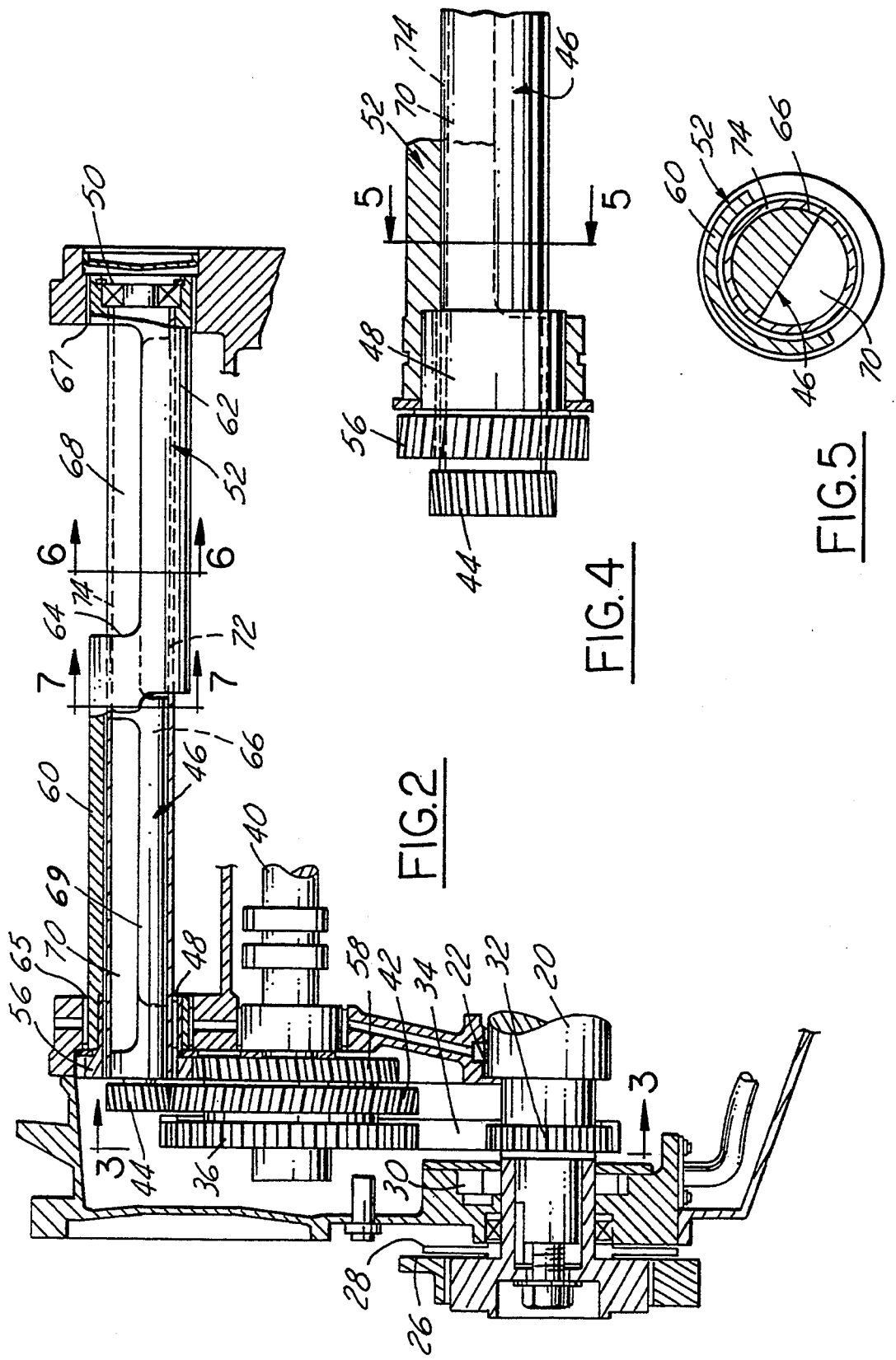

COAXIALLY MOUNTED ENGINE BALANCE SHAFTS

FIELD OF THE INVENTION

This invention relates in general to an automotive type engine, and more particularly, to a balance shaft assembly to improve the inertial unbalance characteristics of a V-six engine.

BACKGROUND OF THE INVENTION

The operation of a 90 degree V-six, four stroke cycle internal combustion engine having offset crankpins on each throw is such that movement of the piston crank mechanism causes an inertial unbalance comprising an eccentric primary rotating unbalance couple turning in the direction of the crankshaft rotation and an eccentric secondary rotating unbalance couple turning opposite to the direction of crankshaft rotation.

A substantial portion of the primary unbalance can be offset by the application of counterweights to the crankshaft in accordance with common practice. However, in many applications, the residual primary and the secondary unbalance is not offset and generally requires the use of a complex or bulky apparatus to cancel the effects of these latter inertial forces.

The invention essentially eliminates the above objections and disadvantages by generating first and second engine order of vibration couples that counter the couples produced by motion of the engine's pistons. This is accomplished by the use of a pair of coaxially mounted balance shafts mounted in the valley of the V formed between the longitudinal banks of cylinders of a V-six engine, for example, for compactness and simplicity. Both shafts are rotated by the camshaft in the same direction at different speeds, and use eccentric counterweights to generate moments that oppose the engine's inertial unbalance couples.

PRIOR ART

The use of additional balance shafts to counteract the residual first order or primary unbalance forces/moments and second order unbalance forces/moments is known.

U.S. Pat. No. 3,511,110, Grieve, shows a crankshaft driven engine balancer assembly for a three cylinder inline engine that includes two pairs of coaxially mounted balance shafts 28,29 and 39,40 mounted in a side-by-side relationship on opposite sides of the crankshaft and driven in opposite directions. The assembly requires four bearing supports for each primary weight shaft, and also four bearings between each secondary shaft and its supporting primary shaft, corresponding to the lateral spacing of the cylinders. Each shaft of each pair is provided with a separate flattened eccentric counterweight for each cylinder between each pair of supports, the counterweights being defined essentially by cutting away semi-circular portions of the shaft.

U.S. Pat. No. 4,480,607, Tsai et al, shows a V-type engine having a single balance shaft located below the crankshaft. A pair of bulky, space consuming Oldham coupling balancers are mounted on the balance shaft, one at each end, to offset a large portion of the engine secondary rotating unbalance couples. The couplings include eccentrically mounted counterweight assemblies 80 that orbit during rotation of the balance shaft to reduce the secondary unbalance moments.

In both of the above cases, it will be noted that the secondary unbalance couples are offset or cancelled only either by the use of pairs of coaxially mounted balance shafts on opposite sides of and driven by the crankshaft, or by the use of complex mechanisms such as Oldham couplings driven by the crankshaft. Neither construction can be fitted into the valley of the V between cylinder banks to provide the compact, simplified construction provided by the invention to be described.

SUMMARY OF THE INVENTION

The invention is directed to a balance shaft assembly consisting of a pair of coaxially mounted balance shafts, one within the other, that extend the length of the engine and are supported only at their ends. The shafts are both driven by the camshaft in the same direction, opposite to that of the crankshaft. The outer shaft constitutes a first order balance shaft driven at twice camshaft speed, while the inner shaft constitutes a second order balance shaft driven at four times camshaft speed.

Both shafts are formed with eccentric counterweights that are diametrically opposed to each other and operate on the same axis of rotation. The inner shaft is mounted in bearings carried by the outer first order balance shaft, the outer shaft being supported by the bearings mounted in the engine block. The compact balance shaft assembly is nestedly located in the valley between the cylinder banks directly above and vertically aligned with the camshaft and the crankshaft. The assembly as described produces rotating moments about the balance shafts. These together with the crankshaft unbalance moments oppose and cancel the second and first order couplings generated by reciprocating motion of the engine piston mechanism.

It is a primary object of the invention, therefore, to provide an engine balance shaft assembly consisting of only two coaxially mounted balance shafts, and an assembly that is compact and lightweight such that it can be convienently fitted inside the valley defined between the two longitudinally extending banks of cylinders a V-type engine.

Other objects, features and advantages of the invention will become more apparent upon reference to the succeeding, detailed description thereof, and to the drawings illustrating the preferred embodiments thereof.

BRIEF DESCRIPTION OF THE DRAWINGS

FIG. 2 is an enlarged cross-sectional view of FIG. 1 of that portion of the engine embodying the invention.

FIG. 4 is an enlarged view of a portion of the FIG. 2 showing.

FIGS. 5, 6 and 7 are cross-sectional views taken on planes indicated by and viewed, respectively, in the direction of the arrows V—V of FIG. 4, and VI—VI and VII—VII of FIG. 2, illustrating parts in rotative positions during operation of the engine.

DESCRIPTION OF THE PREFERRED EMBODIMENT

Figure 1:
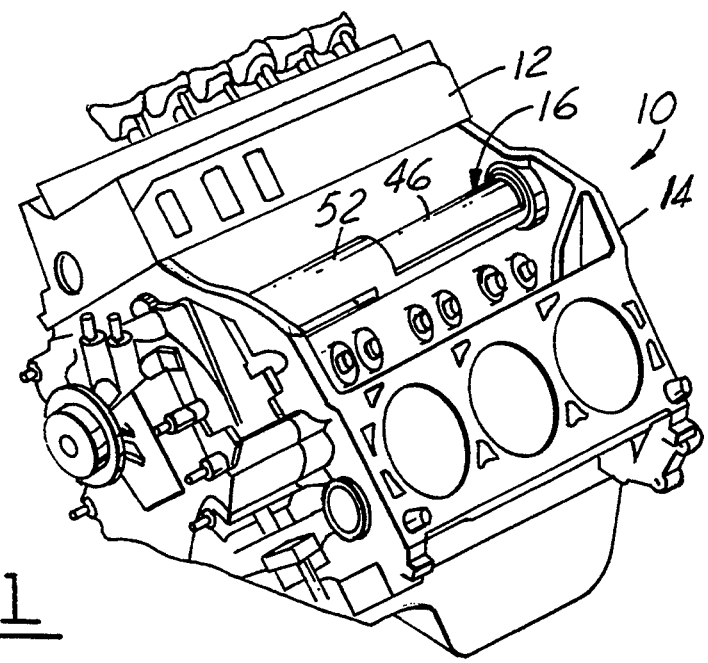
FIG. 1 is a schematic showing of a V-type engine with parts broken away and in section illustrating a portion embodying the invention.

FIG. 1 schematically illustrates a V-type engine 10 having two longitudinally extending cylinder banks 12,14 (See FIG. 3), one being cutaway to illustrate the balance shaft assembly 16 of the invention. The latter consists of a pair of coaxially mounted balance shafts 46,52 that as shown are small enough to be mounted in the valley or V defined between the two banks of engine cylinders, thereby providing a very compact assembly that occupies essentially otherwise unused space in the engine.

Figure 3:
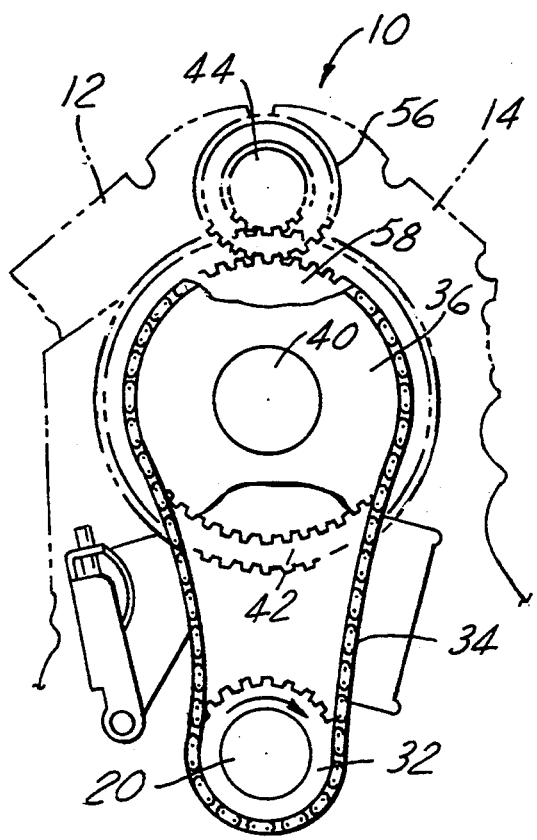
FIG. 3 is a cross-sectional view taken on a plane indicated by and viewed in the direction of the arrows III—III of FIG. 2.

FIG. 2 shows the assembly more in detail. The engine crankshaft, indicated at 20, is rotatable on bearings 22. It includes a damper member 26 and a crankshaft position sensor wheel 28 as well as a gerotor oil pump 30. Also included is a crankshaft drive sprocket wheel 32 connected as best seen in FIG. 3 by a continuous chain drive member 34 to a camshaft drive sprocket 36. The sprocket 36 has twice the teeth of the sprocket 32 to be driven at one-half crankshaft speed. Sprocket 36 is fixed onto a camshaft 40 that extends parallel to and is in vertical alignment with the crankshaft 20 (FIG. 3).

Within the valley of the engine is a hollow or tubular first order balance shaft 52. The latter is rotatably mounted to the engine block in bearings 65,67, as indicated. The front end is fixedly engaged with a gear 56 that engages a first order balance drive gear 58 fixed nonrotatably on the camshaft 40.

Also fixed on camshaft 40 is a second order of vibration balance shaft drive gear 42 that meshes with and drives a second order balance shaft driven gear 44. The latter is secured on the end of the second order balance shaft 46 that is rotatably supported and received within the first order shaft 52.

The second order shaft is supported at the front end in a journal bearing 48 from the first order balance shaft 52. The shaft extends the longitudinal extent of the first order shaft to be supported at its rear end in bearing 50. The bearing 50 not only carries the radial load of the second order shaft, but also controls the axial position of the inner shaft and transfers the thrust of the second order drive gear to the first order shaft.

It should be noted that the two driven gears 44 and 56 would be formed with opposite helix hands so that their thrust forces cancel each other.

With the gearing as shown, camshaft 40 will be rotated at one-half the rpm of crankshaft 20, the first order balance shaft 52 will be rotated at twice camshaft speed and in a direction opposite to that of the crankshaft, and the second order balance shaft will be rotated at four times camshaft speed and in the same direction as the first order shaft.

Turning now to the specific construction of the balance shafts per so, each of the balance shafts have eccentric counterweight portions for generating rotating moments about the shafts that together with the crankshaft unbalance moments will counteract and cancel the first order unbalance moments and most of the second order unbalance inertial moments. The masses of the eccentrics would be specifically chosen to sufficiently accomplish this objective.

More specifically, the first order balance shaft 52 is defined as a tube or sleeve member having arcuate counterweight portions 60,62 extending longitudinally from opposite sides of the shaft center and diametrically opposed to each other. The counterweights can be formed by voiding portions 64,66 of the shaft that extend essentially from the central point of the shaft to the opposite ends. This displaces the center of gravity of these weight portions per se laterally so that during rotation, the eccentric portions generate forces acting in opposite directions at opposite sides of the center to provide moments that will oppose the residual unbalanced first order forces that are generated during normal engine operation.

The inner or second order balance shaft 46 is similarly constructed with eccentric weights 66,68 formed at opposite sides of the central point of the shaft and diametrically opposed to each other, as indicated in FIG. 2. Again, these are defined by voiding portions 70,72 of the inner balance shaft.

The inner shaft 46 is enclosed in a steel outer tube or sleeve 74. Since the balance shafts are only supported at their ends, this particular tube construction of the inner second order shaft enhances the bending stiffness to allow higher rpm operation of the small diameter inner shaft 46 between the far apart bearings at opposite ends of the balance shaft. The counterweights in this case are placed as shown inside the tube.

The mass of the counterweights again would be chosen to generate forces necessary to sufficiently suppress the unbalanced inertial couplings.

Figure 6:
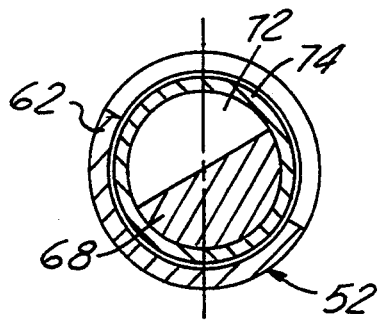
Figure 7:
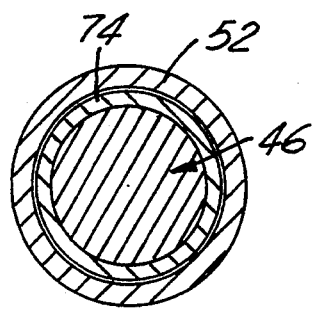

The second order shaft will turn two revolutions for every one of the primary shaft. FIGS. 5, 6 and 7 are illustrative of the parts as they would be in actuality when the number one piston of the engine is at top dead center location. FIGS. 2 and 4 are drawn with the parts rotated out of their actual positions, for clarity of illustrating.

Figure 8:
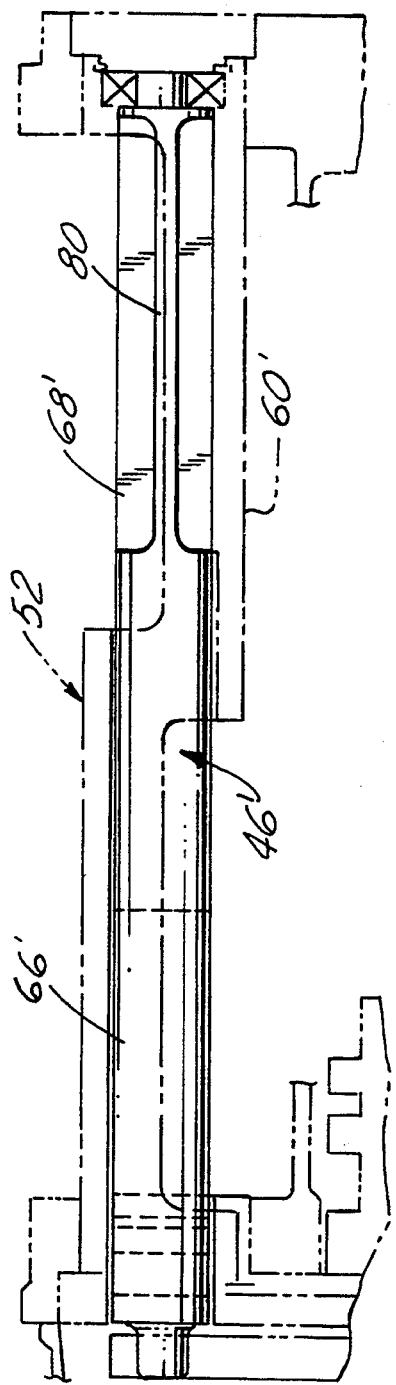
FIG. 8 is a side elevational view similar to the balance shaft assembly of FIG. 2 indicating a modified construction.
Figure 9:
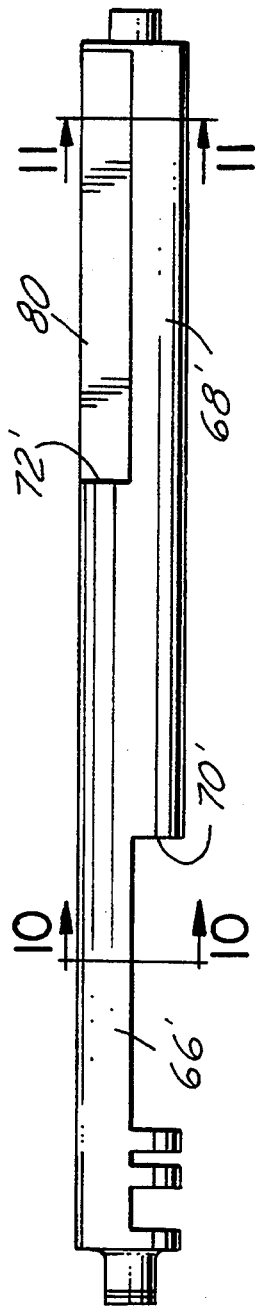
FIG. 9 is a view of the inner balance shaft shown in FIG. 8.
Figure 11:
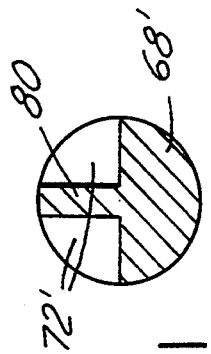
FIGS. 10 and 11 are cross-sectional views taken on planes indicated by and viewed in the direction of the arrows X—X and XI—XI of FIG. 9.
Figure 10:
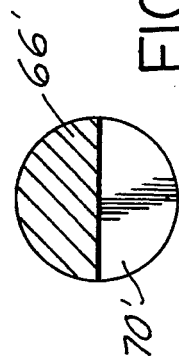

FIGS. 8–11 show a second order balance shaft of simpler construction consisting of a one piece shaft having the eccentric counterweights formed externally integral with it as opposed to the construction described in connection with FIG. 2. In FIG. 8, the first order balance shaft 52 shown in phantom rotatably surrounds a single or one-piece second order balance shaft 46' having essentially the same diametrically opposed counterweights 66',68' defined by voided or relieved portions 70',72'. The required stiffness against bending in this case is provided by a longitudinally extending stiffness member 80.

From the foregoing, it will be seen that the eccentric balance counterweights on the coaxially mounted first and second order balance shafts in each case will generate sufficient moments, as programmed by proper selection of the masses, as is necessary during rotation to oppose the residual primary and second order inertial unbalanced forces of the engine.

It also will be seen that the assembly is disposed in the central area of the cylinder block in the direction along the alignment of cylinders, is supported only at its ends, and is nestled compactly in the valley between the banks of cylinders parallel to and vertically aligned with the camshaft and crankshaft.

While the invention has been shown and described in its preferred embodiments, it will be clear to those skilled in the arts to which it pertains that many changes and modifications may be made thereto without departing from the scope of the invention.

We claim:

1. A balance shaft assembly for a V-shaped engine having laterally spaced longitudinally extending banks of cylinders for driving a centrally mounted crankshaft, and a camshaft driven by the crankshaft at half the speed thereof, the assembly including a pair of balance shafts coaxially mounted one within the other extending the longitudinal length of the banks and being nestledly contained therebetween within the valley of the V, the pair comprising a first order of engine vibration balance shaft receiving a second order of engine vibration balance shaft therewithin, means supporting the shafts only at their ends on bearing means providing relative rotation between the shafts, drive means connecting the camshaft separately to each balance shaft to drive the first and second order balance shafts in the same direction opposite to the crankshaft direction of rotation at twice and four times, respectively, camshaft speed, each balance shaft having essentially symmetrical arcuate mass portions at opposite sides of the shaft centers diametrically opposed to each other to form counterweight portions eccentric with respect to the rotational axis of the balance shaft for effecting upon rotation a moment about the center of the shafts as a fulcrum thereby generating rotating moments sufficient to offset first and second order engine unbalanced inertial moments/couples developed upon rotation of the engine crankshaft and its components.

2. A balance shaft assembly for a V-type engine having a pair of longitudinally extending, laterally spaced banks of cylinders for driving a centrally mounted crankshaft, a camshaft parallel to and driven by the crankshaft at one-half the speed thereof with the vertical axes of the shafts aligned, and first counterweights carried by the crankshaft for balancing a large portion of the unbalanced first order vibrational forces of the engine generated upon operation of the engine, the assembly including a hollow first order of engine vibration balance shaft coaxially mounted with respect to and surrounding a second order of engine vibration balance shaft within, the shafts being mounted at their ends on bearings permitting relative rotation between the shafts and driven at different speeds by the camshaft, the shafts being contained within the valley of the V of the engine vertically aligned with and above the camshaft, each of the balance shafts having counterweights formed at diametrically opposite end portions to generate first and second order moments acting in a direction that essentially cancel the natural unbalanced second order and the remaining first order of engine vibration during engine operation.

3. Assembly as in claim 2, wherein the first and second order balance shafts are driven at two and four times, respectively, of camshaft speed.

4. An assembly as in claim 2, wherein the balance shaft counterweights consist of arcuate mass portions generating forces on each shaft acting in opposite directions at opposite ends.

5. An assembly as in claim 2, wherein the balance shaft counterweights are formed by voiding diametrically opposed arcuate portions of each shaft.

6. A balance shaft assembly for a V-type engine including first and second order of engine vibration balance shafts each with a pair of eccentric weights thereon, the shafts being coaxially mounted one within the other within the valley of the V and driven by the camshaft at different speeds and extending the length of the engine supported at their ends by a pair of bearing means permitting relative rotation between the shafts to essentially cancel the residual unbalanced inertial first and second order vibrational forces occurring during operation of the engine.

7. An assembly as in claim 6, the inner second order shaft including a tubular sleeve shaft receiving the second order shaft within with eccentric counterweights theron.

8. An assembly as in claim 6, wherein the eccentric weights comprise arcuate shaft portions diametrically opposite each other on opposite sides of the center of each balance shaft.

9. An assembly as in claim 6, the inner shaft being one-piece and having externally located counterweights.

10. An assembly as in claim 6, wherein the first and second balance shafts are driven at two and four times, respectively, camshaft speed and in opposite direction to that of the crankshaft.

* * * * *